United States Patent [19]

Magne

[11] 3,978,025
[45] Aug. 31, 1976

[54] LIQUID METHYL VINYLPHENYLPOLYSILOXANE RESINS

[75] Inventor: Robert Magne, Lyon, France

[73] Assignee: Rhone-Poulenc S.A., Paris, France

[22] Filed: Sept. 6, 1974

[21] Appl. No.: 503,771

[30] Foreign Application Priority Data
Sept. 10, 1973  France .............................. 73.32456
July 31, 1974  France .............................. 74.26668

[52] U.S. Cl. .................. 260/46.5 UA; 260/46.5 G; 260/448.2 Q; 260/825; 260/827; 427/387
[51] Int. Cl.² ....................................... C08G 77/04
[58] Field of Search .......... 260/46.5 G, 46 UA, 825, 260/448.2 Q, 827; 117/132 BS

[56] References Cited
UNITED STATES PATENTS

| | | | |
|---|---|---|---|
| 3,489,782 | 1/1970 | Pruvost et al. ................. | 260/46.5 R |
| 3,527,655 | 9/1970 | Ballard ......................... | 260/46.5 UA |
| 3,629,297 | 12/1971 | Antonen ..................... | 260/46.5 UA |
| 3,759,867 | 9/1973 | Merrill et al. ................. | 260/46.5 R |
| 3,792,012 | 2/1974 | Zdaniewski ................... | 260/46.5 R |

*Primary Examiner*—Melvyn I. Marquis
*Attorney, Agent, or Firm*—Stevens, Davis, Miller & Mosher

[57] ABSTRACT

Liquid methylvinylphenylsiloxane resins are provided which are suitable for coating electrical conductors; they possess the particular advantage that the surfaces of such coatings can be crosslinked such that the surfaces are not sticky. These resins comprise recurring units chosen from the formulae: $CH_3SiO_{1.5}$, $(CH_3)_2SiO$, $CH_3(CH_2=CH)SiO$, $CH_3(C_6H_5SiO)$, $C_6H_5SiO_{1.5}$ and $(C_6H_5)_2SiO$ and corresponding to the average general formula:

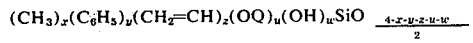

$$(CH_3)_x(C_6H_5)_y(CH_2=CH)_z(OQ)_u(OH)_wSiO_{\frac{4-x-y-z-u-w}{2}}$$

in which Q represents an alkyl group with 1 to 4 carbon atoms, $x$ and $y$, which may be identical or different, each represent a number from 0.55 to 0.85, $z$ represents a number from 0.08 to 0.35, $u$ represents a number from 0.08 to 0.3, and $w$ represents a positive number which does not exceed 0.1, the sum $x + y + z$ being from 1.5 to 1.9, and having a functional group content E of from 2.5 to 2.9.

15 Claims, No Drawings

LIQUID METHYL VINYLPHENYLPOLYSILOXANE RESINS

The present invention relates to liquid methylvinylphenylpolysiloxane resins.

Liquid organosilicon resins, free from solvents, are widely used for manufacturing laminates, powders for moulding, binders for ceramics or protective coatings (see, for example, French Pat. Nos. 1,546,377, 1,568,812, 2,079,377, 2,079,378 and 2,128,782; U.S. Pat. No. 3,183,209 and Russian Pat. No 346,317). After curing, these resins possess, in addition to their well known insulating properties, very good resistance to aging when exposed to heat and they adhere effectively to the materials which they coat or impregnate.

However, when for ease of application, they are cured in air, it is frequently rather difficult to achieve complete crosslinking of their surfaces. As a result of this, these surfaces remain sticky and consequently have a rather unpleasant appearance, and, furthermore, this crosslinking deficiency facilitates degradation at high temperatures and by atmospheric agents.

In order to overcome this disadvantage, it has been proposed to apply to these sticky surfaces (see French Pat. No. 1,573,602) organosilicon compounds possessing Si—N bonds, dissolved in organic diluents. At the industrial level, this technique requires special, and thus expensive, equipment and consequently cannot be employed by all those who use organosilicon resins free from solvents. Accordingly there is a need to find a way of solving this problem which, in particular, does not involve an additional treatment stage.

The present invention relates to liquid methylvinylphenylpolysiloxane resins which cure completely both at the surface and throughout their thickness, in air, by means of organic peroxides. According to this invention there are provided liquid organosilicon methylvinylphenylpolysiloxane resins, which are stable when stored, and which are formed of units chosen from the formulae $CH_3SiO_{1.5}$, $(CH_3)_2SiO$, $CH_3(CH_2=CH)SiO$, $CH_3(C_6H_5)SiO$, $C_6H_5SiO_{1.5}$ and $(C_6H_5)_2SiO$, such that:

1. they correspond to the average general formula

$$(CH_3)_x(C_6H_5)_y(CH_2=CH)_z(OQ)_u(OH)_wSiO_{\frac{4-x-y-z-u-w}{2}}$$

in which the symbol Q represents an alkyl group with 1 to 4 carbon atoms, the symbols $x$ and $y$, which may be identical or different, represent any number whatsoever from 0.55 to 0.85, preferably 0.6 to 0.8, the symbol $z$ represents any number whatsoever from 0.08 to 0.35, preferably from 0.1 to 0.3, the symbol $u$ represent any number whatsoever from 0.08 to 0.3, preferably from 0.11 to 0.23, and the symbol $w$ represents any number whatsoever which does not exceed 0.1 and which preferably does not exceed 0.07, the sum $x + y + z$ being from 1.5 to 1.9, preferably 1.55 to 1.85, and 2. their functional group content E is from 2.5 to 2.9, preferably 2.55 to 2.85. The "functional group content E" as used herein is defined by the equation $E = 4 + 2(CH_2=CH/Si) - R/Si$ in which the ratio $R/Si$ represents the number of methyl, vinyl and phenyl radicals per silicon atom, that is to say the sum $x + y + z$, and the ratio $CH_2=CH/Si$ represent the number of vinyl radicals per silicon atom, that is to say $z$. In other words, $E = 4 + z - x - y$. Thus, the functional group content E of the resin corresponds, in effect, to the number of bonds of the Si-O-Si and Si-alkylene-Si type per silicon atom, which have been formed or which can form.

The present invention also provides compositions comprising:

83 to 95% by weight of liquid organosilicon resin of this invention, in which $u$ represents any number whatsoever ranging from 0.08 to 0.2 and $w$ represents any number whatsoever which does not exceed 0.03; and (correspondingly) 17 to 5% by weight of organic diluent, which possesses at least one aliphatic unsaturated, generally ethylenic bond.

The symbol Q can represent, more precisely, as an alkyl radical with 1 to 4 carbon atoms, the methyl radical which is preferred or the ethyl, propyl, isopropyl, butyl or isobutyl radical.

The liquid methylvinylphenylpolysiloxane resins of the present invention can be prepared by a process comprising several stages:

a. cohydrolysis of chlorosilanes, chosen from the chlorosilanes of the formulae: $CH_3SiCl_3$, $(CH_3)_2SiCl_2$, $CH_3(CH_2=CH)SiCl_2$, $CH_3(C_6H_5)SiCl_2$, $C_6H_5SiCl_3$ and $(C_6H_5)_2SiCl_2$, by contacting aqueous-alcoholic mixtures, the alcohols of which are alkanols with 1 to 4 carbon atoms, at a temperature of from 5°C to 80°C, with a solution in an organic diluent containing 20 to 50% by weight of mixtures of the abovementioned chlorosilanes, b. isolation of the organic layers and treatment with water at a temperature of from 10°C to 100°C, c. further isolation of the organic layers, removal of their remaining acidity and distillation of the organic diluents, and, optionally, d. heating, in an organic diluent medium, the resins obtained in step (c) with 0.005 to 0.5% by weight based on the weight of the resin of a basic compound which is an alkali metal hydroxide or a quaternary ammonium or phosphonium hydroxide.

It will, of course, be appreciated that some of the specified chlorosilanes are essential components of the mixture in order that a resin of the specified formula is obtained.

This process is characterised:

1. in that the mixtures of chlorosilanes are made up in such a way that:

i. the number of methyl radicals, the number of phenyl radicals and the number of vinyl radicals per silicon atom which these mixtures contain coincide with the above-mentioned values for the symbols $x$, $y$ and $z$, respectively, ii. the sum of these numbers also coincides with the abovementioned values for the sum $x + y + z$, and iii. the functional group content E, calculated from these numbers, is from 2.5 to 2.9;

2. in that the aqueous-alcoholic solutions are used in sufficient quantities to provide, for each gram atom of chlorine in the chlorosilanes employed in step (a), at least 0.5 mol of alcohol and at least 0.3 mol of water; and 3. in that the water employed in step (b) is present in an amount of at least 1 mol per 1 mol of chlorosilane.

Methanol, ethanol and isopropanol are used more particularly as the alkanol with 1 to 4 carbon atoms.

In order to work in a homogeneous medium and also in order to prevent the temperature of the reaction mixture from rising too suddenly, the mixtures of chlorosilanes are first diluted with organic diluents such as toluene, xylene, cumene, chlorobenzene, cyclohexane, methylcyclohexane, diisopropyl ether, ethyl acetate and butyl acetate. It is advisable to use solutions containing 20 to 50% by weight of chlorosilanes.

The hydrolysis/alcoholysis reaction which has to be effected, as already indicated, in a homogeneous medium can be carried out within a wide temperature range, namely from 5°C to 80°C. The temperature chosen is a function mainly of the nature of the chlorosilanes employed. During this reaction, hydrogen chloride tends to be evolved, and it is advisable to provide a device to trap it.

When the whole of the aqueous-alcoholic solution has been added, contact between the reagents can be maintained, if necessary, for some time longer in order to react most of the Si-Cl bonds of the chlorosilanes with the water and the chosen alcohol, and then for each operation, the organic layer is separated from the lower acid layer.

Each organic layer is then treated with water, generally a large excess, for example at least 1 mol, and preferably at least two mols, per mol of chlorosilanes employed, for the purpose of removing the remaining SiCl bonds as well as the free alcohol. This water also serves to hydrolyse some of the SiOQ bonds formed, and leads to an increase in the molecular weight of the organosilicon polymers formed by hydrolysis/alcoholysis.

This hydrolysis reaction can take place within a wide temperature range, for example from 10°C to 100°C; moreover, the temperature need not be constant throughout the reaction and can be changed at will, for example on the basis of results derived from analysing samples removed, so as to produce resins which possess the desired proportion of alkoxy groups bonded to silicon atoms, and the desired viscosity.

If, after the introduction of the water is complete, the abovementioned characteristics are not reached, contact between the reagents can be extended until the desired values are obtained.

Each aqueous layer is then removed and each solution of resin is washed with water in accordance with conventional methods; it is preferable to add a common alkaline agent, such as sodium carbonate or sodium bicarbonate, to the wash waters in order to remove the last traces of acidity more easily from the resins.

When these tracks of acidity persist after the washing stage, it is recommended to treat the solutions of resins with a dispersion of 2 to 10% by weight of an alkaline agent, for example sodium bicarbonate, in an alkanol; the amount of alkaline agent used depends on the residual acidity but, even if used in great excess, it does not cause condensation of the functional groups of the resin. It is advantageous to choose the same alkanol as that already employed in the hydrolysis/alcoholysis reaction.

The organic solutions of resins are then filtered if necessary and the solvents and volatile products are removed by distillation, preferably under a pressure less than atmospheric pressure. In order to promote this removal, the resins can be heated to 200°C or above.

The resins obtained are liquid polymers, generally having a viscosity of at most 4,000 cPo at 25°C, which correspond to the abovementioned average general formula in which the values of the various symbols are as specified above.

These resins can be used directly, after adding suitable organic peroxides, to protect pieces of electrical equipment. The peroxides are added in an amount from 0.5 to 5% by weight of the resins, this amount being directly proportional to the number of vinyl groups bonded to silicon atoms in the resins.

Dicumyl peroxide, di-(tertiary butyl) peroxide, tertiary butyl perbenzoate, benzoyl peroxide and 2,5-dimethyl-2,5-di-(tertiary butylperoxy)-hexane are especially suitable as organic peroxides.

However, for special applications which require relatively thick layers of these resins, i.e. greater than 1 mm, to be deposited, it is advisable, to prevent blisters from forming within these layers, to increase the degree of crosslinking of the resins by condensing some of their functional groups. This condensation can be effected by heating, preferably under reflux, in solvents of the type already mentioned for the preparation of the resins, in the presence of an alkaline agent chosen from alkali metal hydroxides and quaternary ammonium and phosphonium hydroxides. The amount of alkaline agents used can be quite low, for example from 0.005 to 0.5% by weight relative to the weight of the resins. The solvents are used mainly to adjust the heating temperature and to promote the dispersion of the alkaline agents throughout the resins; they can represent, for example, from 5 to 40% of the weight of the solutions.

After the desired degree of condensation of the resins has been reached (the symbol $u$ then represents any number whatsoever ranging only from 0.08 to 0.2 and the symbol $w$ does not exceed 0.03), the solutions are neutralised by means of an acidic agent, preferably a volatile acidic agent, such as formic acid or acetic acid, and then the solvents are removed by distillation. The resins can then be heat-treated, up to temperatures of say 250°C, and under a pressure less than atmospheric pressure in order to remove the polymers of low molecular weight which they may still contain.

The resins condensed in this way have rather high viscosities, generally above 1,000 cPo at 25°C and sometimes exceeding 25,000 cPo at 25°C. This high viscosity is a handicap when the resins are to be used to impregnate porous materials or to fill up very narrow interstices; it is then desirable to dilute them with compounds of low molecular weight, which can be copolymerised by the abovementioned organic peroxides. Commercially available organic compounds, each of which possesses at least one aliphatic unsaturated bond, can be used for this purpose.

These copolymerisable organic compounds must be used in an amount to allow the resins to be sufficiently fluid for the particular application; this is generally from 5 to 17%, preferably 6 to 15%, of the weight of the mixtures of resins and copolymerisable compounds; larger amounts are not advisable since they can cause the copolymers formed to lose their ability to withstand high temperatures.

The following compounds are typical copolymerisable organic compounds: esters of unsaturated carboxylic acids and glycols or polyalkylene glycols, such as ethylene glycol mono- or di-methacrylate, ethylene glycol mono- or di-acrylate, propylene glycol mono- or di-methacrylate and diethylene glycol mono-acrylate or methacrylate, esters of carboxylic acids and unsaturated aliphatic alcohols, such as diallyl phthalate and diallyl maleate, unsaturated ethers of polyols, such as the allyl diether of trimethylolpropane, and aromatic compounds such as styrene and divinylbenzene.

To these mixtures consisting of resins and copolymerisable organic compounds, the peroxides mentioned above can be added in the same proportions, that is to say in an amount from 0.5 5% of the weight of the mixtures.

The thus catalysed organosilicon resins, whether or not they are diluted with copolymerisable organic compounds, are stable when stored for periods of a year or more; moreover, when they are about to be used, it is possible, if necessary, to make them more fluid by heating them to, say, 70°C–80°C; thus resins of viscosity of the order of 500 cPo at 25°C have their viscosity reduced to about 100 cPo at these temperatures by this simple operation which does not in any way cause gelling to start. After these resins have been applied to the materials to be treated, they can be cured simply by heating in air for several hours at temperatures not exceeding 240°C, preferably from 180° to 220°C. This heating makes it possible to achieve complete cross-linking; in particular the surfaces exposed to the atmosphere are hard and dry.

The diluted or undiluted resins of this invention can be used in the electrotechnical field mainly for impregnating devices which conduct electricity. They adhere strongly to materials made of copper (whether or not they are covered with insulating tapes) and they show good resistance to aging when exposed to heat; in particular even after aging at 220°C for 1,000 hours, they possess a cohesive force (or an agglomerating power, as measured in accordance with French Standard Specification UTE C 26,937, except that the aluminum wire of the Specification is replaced by a 1 mm thick copper wire insulated with glass and silicone resin) which can exceed 13 kg.

The (diluted or undiluted) methylvinylphenyl-polysiloxane resins can also be cured at considerably lower temperatures when these (diluted or undiluted) resins have added to them, in addition to the amounts of organic peroxides, organosilicon polymers possessing SiH bonds, and platinum, in an amount 0.0002% to 0.003% preferably 0.0003 to 0.002%, of platinum relative to the mixtures of resins or of compositions containing these resins and organosilicon polymers, in the form of platinum compounds which are soluble or which can be dispersed easily in these mixtures (the percentages being expressed by weight), the latter two constituents being introduced in any order and when the whole is kept at a temperature from 100°C to 180°C for at least 3 hours.

The organosilicon polymers possessing SiH bonds usually correspond to the general formula

$(CH_3)_l(C_6H_5)_mH_nSiO \frac{4-l-m-n}{2}$ in which the symbols $l$ and $m$, which may be identical or different, represent any number whatsoever from 0.5 to 0.95, preferably 0.55 to 0.9, and the symbol $n$ represents any number whatsoever from 0.3 to 0.65, preferably 0.33 to 0.6, the sum $l + m + n$ being from 1.8 to 2.3, preferably 1.82 to 2.25. These organosilicon polymers possessing SiH bonds are suitably used in amounts such that the numerical ratio of SiH groups in the polymers to vinyl groups in the resins, or in the compositions in which the resins are present, is from 0.05/1 to 0.5/1.

The organosilicon polymers possessing Si-H bonds can be prepared by cohydrolysis, followed by a rearrangement, of mixtures of suitable chlorosilanes. These chlorosilanes are chosen from those of the formulae: $C_6H_5SiCl_3$, $(C_6H_5)_2SiCl_2$, $CH_3SiCl_3$, $(CH_3)_2SiCl_2$, $(CH_3)_3SiCl$, $(CH_3)_2C_6H_5SiCl$, $(C_6H_5)CH_3SiCl_2$, $(CH_3)HSiCl_2$, $(CH_3)_2HSiCl$, $(C_6H_5)HSiCl_2$ and $HSiCl_3$. By "suitable mixtures," there are to be understood mixtures, each of which contains a number of methyl groups relative to a single silicon atom, a number of phenyl groups relative to a single silicon atom and a number of hydrogen atoms relative to a single silicon atom, which coincide respectively with the values represented by the symbols $l$, $m$ and $n$, it also being necessary for the sum of these numbers to coincide with the values allowed for the sum $l + m + n$.

Thus, by way of examples, these mixtures can contain chlorosilanes of the formulae $C_6H_5SiCl_3$, $(C_6H_5)_2SiCl_2$, $(CH_3)HSiCl_2$ and $(CH_3)_3SiCl$, in the molar ratio respectively 4/5/9/2 ($l = 0.75$, $m = 0.7$ and $n = 0.45$) or chlorosilanes of the formulae $C_6H_5SiCl_3$, $CH_3(C_6H_5)SiCl_2$, $(CH_3)_2HSiCl$ and $(CH_3)HSiCl_2$, in the molar ratio, respectively 4/6/2/4 ($l = 0.87$, $m = 0.62$ and $n = 0.37$).

The cohydrolysis can be effected by bringing water, in excess relative to the amount necessary to form the siloxane bonds, into contact (gradually) with the abovementioned mixtures of chlorosilanes. It is, however, recommended to dilute the mixtures of chlorosilanes beforehand in organic diluents such as toluene, xylene, cyclohexane, ethyl acetate, acetone, ethyl ether or isopropyl ether, in order to prevent the formation of products which are sparingly soluble in the reaction medium, as well as to prevent too great localised rises in temperature.

Once the cohydrolysis is complete, the polysiloxane hydrolysates, which may or may not be dissolved in the abovementioned diluents, are freed from the traces of acidity which they contain, for example by washing with water followed by a treatment with alkaline compounds. These neutralised hydrolysates, free from diluents, are heated to a temperature of, for example, 150°C to 250°C, in the presence of an acid rearrangement catalyst such as sulphuric acid and an acid activated earth; during this heating process, not only does rearrangement of the siloxane bonds take place, but also condensation of the Si-OH bonds.

These polymers mix readily with the diluted or undiluted methylvinylphenylpolysiloxane resins of this invention, the amounts incorporated being such that the numerical ratios of SiH groups to vinyl groups range, as already indicated, from 0.05/1 to 0.5/1, preferably 0.1/1 to 0.45/1; the vinyl groups comprise both vinyl groups bonded to silicon atoms and vinyl groups bonded to carbon atoms - the latter type of vinyl group is obviously taken into consideration only if the polymerisable organic compounds are used as diluents for the methylvinylphenylpolysiloxane resins.

Catalysts based on platinum which are soluble or which can be dispersed easily in the mixtures consisting of the (diluted or undiluted) methylvinylphenyl-polysiloxane resins and the hydrogenated organosilicon polymers can be added at the same time as the organosilicon polymers.

These catalysts are well known; typical examples include chloroplatinic acid dissolved in diluents such as isopropanol and butyl phthalate, products resulting from the reaction of this acid with alkanols, and complexes of platinum chlorides with compounds such as olefines, polysiloxanes possessing vinyl groups, phosphines, arsines and hydrocarbon sulphides.

The various ingredients can be incorporated in any order, but it is preferable to add the platinum catalysts last. In fact, it is often necessary to treat the mixtures beforehand in order to disperse or dissolve the peroxides and, if the platinum catalysts were present this heating would present the risk of promoting the attachment of the SiH bonds to the vinyl bonds.

After these mixtures have been deposited on the materials to be protected, they can be cured by heating in air, generally for at least 3 hours at a temperature from 130°C to 180°C, preferably 140°C to 180°C; these heating conditions produce resinous products which are essentially completely crosslinked and which possess high agglomerating power.

The following Examples further illustrate the present invention; percentages are expressed by weight.

EXAMPLE 1 a. 3,701.5 g of a mixture of chlorosilanes consisting of 3 mols of $CH_3SiCl_3$, 4 mols of $C_6H_5SiCl_3$, 2 mols of $(C_6H_5)_2SiCl_2$, 7 mols of $C_6H_5(CH_3)SiCl_2$ and 4 mols of $CH_3(CH_2=CH)SiCl_2$ and 6,200 g of toluene are placed in a 20 l flask equipped with a stirrer and an external cooling device. The solution obtained contains approximately 37% of chlorosilanes.

Stirring is started and 1,296 g of another solution consisting of 348 g of water (19.35 mols) and 948 g of methanol (29.6 mols), corresponding to 0.630 mol of methanol and 0.412 mol of water for each gram atom of chlorine belonging to the chlorosilanes, are introduced into the first solution over a period of 1 hour 30 minutes; during this introduction process, the external cooling is adjusted to keep the temperature of the reaction mixture below 30°C.

After the end of the introduction process, stirring is continued for 25 minutes and then stopped; two phases separate out; the lower acid phase is removed and 1,000 g of water (corresponding to 50 g per mol of chlorosilanes employed) are added, with stirring, over a period of 30 minutes, to the remaining organic phase. Stirring is continued for 10 minutes and is then stopped again; two phases separate out; the lower aqueous phase is removed and the remaining organic phase is washed firstly with 1,000 g of water and secondly with 1,000 g of water containing 50 g of sodium bicarbonate.

This organic phase is finally treated with a mixture consisting of 750 g of methanol and 50 g of sodium bicarbonate, with stirring for 12 hours.

After removing the methanolic layer, the organic phase is filtered and then distilled under reduced pressure in order to remove the toluene and the products of rather low molecular weight. After almost all the toluene has been removed, the pressure is reduced to about 2-3 mm of mercury and the residual mixture is heated gradually for 30 minutes to a temperature of 200°C.

2,465 g of an organosilicon resin A, of viscosity 413 cPo at 25°C, corresponding to the average general formula $(CH_3)_{0.7}(C_6H_5)_{0.75}(CH_2=CH)_{0.2}(CH_3O)_{0.2}(OH)_{0.06}SiO_{1.04}$ and with a functional group content of 2.75, are collected.

b. 1,000 g of the organosilicon resin prepared under (a) and 250 g of toluene are placed in a 2 liter flask equipped with a stirrer. The solution obtained is heated to 60°C and 2.5 cm³ of a solution in methanol containing 100 g of potassium hydroxide per liter, corresponding to 250 mg of potassium hydroxide per 1 kg of resin, are introduced into the flask at this temperature.

The whole of the mixture is heated to the reflux temperature and a sufficient amount of toluene is distilled to raise the temperature of the contents of the flask to 115°C; refluxing under these conditions is maintained for 2 hours. The mixture is allowed to cool to 95°C and 0.5 cm³ of acetic acid is introduced into the flask; heating is continued at a temperature of 95°C for 1 hour 30 minutes. The mixture is allowed to cool to ambient temperature and is filtered.

The mixture is heated first under a pressure of approximately 25 mm of mercury in order to drive off the toluene; after this solvent has been removed, the temperature of the residue is raised gradually to 200°C and at the same time the pressure is reduced to 2 mm of mercury. The residue is then treated for 1 hour under these temperature and pressure conditions. The mixture is allowed to cool to 100°C and is filtered.

927 g of a resin A', of make-up similar to that prepared under (a), of viscosity 8,950 cPo at 25°C, corresponding to the average general formula $(CH_3)_{0.70}(C_6H_5)_{0.75}(CH_2=CH)_{0.2}(CH_3O)_{0.16}(OH)_{0.006}SiO_{1.09}$ are collected.

EXAMPLE 2

Two resins $A_1$ and $A_2$ are prepared, both by following the procedure described in Example 1 (a)

The chlorosilanes used to manufacture these resins as well as the amounts employed are given in Table 1 below.

TABLE 1

| Starting chlorosilanes in mols | Resins prepared $A_1$ | $A_2$ |
|---|---|---|
| $CH_3SiCl_2$ | 2.5 | |
| $C_6H_5SiCl_3$ | 2 | 3.5 |
| $C_6H_5(CH_3)SiCl_2$ | 4 | 4 |
| $(CH_3)_2SiCl_2$ | | 1.5 |
| $CH_3(CH_2=CH)SiCl_2$ | 1.5 | 1 |

$A_1$ has a viscosity of 1,250 cPo at 25°C and a functional group content of 2.75 and corresponds to the average general formula
$(CH_3)_{0.8}(C_6H_5)_{0.6}(CH_2=CH)_{0.15}(CH_3O)_{0.15}(OH)_{0.07}SiO_{1.11}$.
$A_2$ has a viscosity of 3,400 cPo at 25°C and a functional group content of 2.55 and corresponds to the average general formula
$(CH_3)_{0.8}(C_6H_5)0.75(CH_2=CH)_{0.1}(CH_3O)_{0.23}(OH_{0.05}SiO_{1.03}$.

EXAMPLE 3

4 resins $A_3$, $A_4$, $A_5$ and $A_6$, all with functional group contents of 2.75, are prepared by following the process below, similar to that described in Example 1 (a), A sufficient amount of toluene is added to each mixture of the starting chlorosilanes, placed in a suitable container, in order to have a solution containing approximately 40% by weight of chlorosilanes. A mixture consisting of methanol and water, the methanol being used at the rate of 0.630 mol and the water at the rate of 0.41 mol for each gram atom of chlorine belonging to the chlorosilanes employed, is then introduced into the above solution which is stirred. The time taken to effect the introduction process is approximately 1 hour 45 minutes. However, during this introduction process, when approximately one-third of the aqueous-methanolic mixture has been added, the contents of the container are heated gradually so as to reach a temperature of about 65°C at the end of the addition of the mixture. After stirring has been stopped, the lower acid layer is removed and the toluene layer is hydrolysed by means of an amount of water corresponding to 50 g per mol of chlorosilanes employed. The water for hydrolysis is introduced over a period of 2 hours in a non-uniform manner, one-fourth of the entire amount being added in the first 45 minutes and the remaining three-fourths in the other 75 minutes.

During this entire introduction process, the temperature of the hydrolysis medium is kept at about 65°C–70°C; the contents of the container are then stirred for 15 minutes and then, after stirring has been stopped, the lower aqueous layer is removed. The remaining toluene layer is washed with the amount of water necessary to remove the residual acidity.

The toluene layer is then filtered and thereafter distilled under reduced pressure in order to drive off the toluene, the traces of water and the products of rather low molecular weights.

After the toluene has been removed, the pressure is adjusted to about 2–3 mm of mercury and the temperature of the residue is raised to 200°C; the residue is then treated under these temperature and pressure conditions for 1 hour.

The chlorosilanes employed and the amounts used in mols are given in Table 2 below.

TABLE 2

| Starting chlorosilanes | Resins prepared | | | |
|---|---|---|---|---|
| | $A_3$ | $A_4$ | $A_5$ | $A_6$ |
| $CH_3SiCl_3$ | 35 | 25 | 15 | 25 |
| $C_6H_5SiCl_3$ | | | | 20 |
| $(C_6H_5)_2SiCl_2$ | 36.25 | 37.5 | 38.75 | 25 |
| $(CH_3)_2SiCl_2$ | 8.75 | 12.5 | 16.25 | 15 |
| $CH_3(CH_2=CH)SiCl_2$ | 20 | 25 | 30 | 15 |

$A_3$ has a viscosity of 950 cPo at 25°C and correspond to the average general formula:
$(CH_3)_{0.725}(C_6H_5)_{0.725}(CH_2=CH)_{0.2}(CH_3O)_{0.19}(OH)_{0.06}SiO_{1.05}$;
$A_4$ has a viscosity of 391 cPo at 25°C and corresponds to the average general formula:
$(CH_3)_{0.75}(C_6H_5)_{0.75}(CH_2=CH)_{0.25}(CH_3O)_{0.18}(OH)_{0.07}SiO$;
$A_5$ has a viscosity of 203 cPo at 25°C and corresponds to the average general formula:
$(CH_3)_{0.775}(C_6H_5)_{0.775}(CH_2=CH)_{0.3}(CH_3O)_{0.19}(OH)_{0.06}SiO_{0.95}$;
$A_6$ has a viscosity of 2,300 cPo at 25°C and corresponds to the average general formula:
$(CH_3)_{0.7}(C_6H_5)_{0.7}(CH_2=CH)_{0.15}(CH_3O)_{0.19}(OH)_{0.07}SiO_{1.1}$.

The resin $A_4$ is subjected to a heat treatment for the purpose of increasing its degree of crosslinking by means of a solution of potassium hydroxide in methanol, in accordance with the process described in Example 1 (b); after this treatment, the resin $A'_4$ thus obtained has a viscosity of 6,000 cPo at 25°C and corresponds to the average general formula:
$(CH_3)_{0.75}(C_6H_5)_{0.75}(CH_2=CH)_{0.25}(CH_3O)_{0.11}(OH)_{0.006}Si—O_{1.07}$.

EXAMPLE 4

10% of ethylene glycol dimethacrylate of the formula $$CH_2=C-COOCH_2CH_2OOC-C=CH_2$$
$$\quad\ \ |\qquad\qquad\qquad\qquad\qquad |$$
$$\quad\ \ CH_3\qquad\qquad\qquad\qquad\quad CH_3$$

followed by 1.2% of dicumyl peroxide are added to the resin A', prepared in Example 1.

In order to facilitate the incorporation of the peroxide, it is added first to a portion (approximately 20%), heated to 60°C, of the mixture of resin and ethylene glycol dimethacrylate; after the peroxide has dissolved, the solution thus obtained is added to the remaining portion which has been left to stand at ambient temperature.

The diluted and catalysed resin A' has a viscosity of 580 cPo at 25°C.

The resin $A'_4$ prepared in Example 3 is diluted and catalysed in accordance with the same process except that 1.4% of dicumyl peroxide instead of 1.2% are added to it. This diluted and catalysed resin has a viscosity of 980 cPo at 25°C.

The agglomerating power (or the cohesive force) of the resins A' and $A'_4$ are then examined by following the procedure of French Standard Specification UTE C 26,937; however, instead of being made of aluminium wire, the coils are made of copper wire of diameter 1 mm, covered with glass and silicone resin, which is more resistant to oxidation and withstands high temperatures better.

These coils are coated with one or other resin by double impregnation, reversing the direction for the second impregnation, under a pressure of 2–3 mm of mercury, in order to join the turns to one another uniformly and continuously.

After the first impregnation, the coils are heated at 180°C for 5 hours. After the second impregnation, the coils are heated either at 200°C for 36 hours or 48 hours or at 220°C for 24 hours or 36 hours. No matter what the temperature, the duration of polymerisation and the type of resin may be, it is found that the coils are all coated with a layer of perfectly polymerised resin which is not sticky to the touch.

The agglomerating power of the two resins, that is to say the force necessary to break the coils by pulling, is then measured at ambient temperature; a tensometer is used for this purpose and breaking forces ranging from 20 to 30 kg are found for all the coils.

These coils are aged by exposure to heat by heating them at 220°C for 1,000 hours, and then the agglomerating power of the two resins is measured as before; breaking forces ranging from 8 to 15 kg are found for all the coils.

EXAMPLE 5

1.2%, 1%, 0.8%, 1.2%, 1.4%, 1.5% and 1% of dicumyl peroxide are added respectively to each of the following resins: A prepared in Example 1, $A_1$ and $A_2$ prepared in Example 2, and $A_3$, $A_4$, $A_5$ and $A_6$ prepared in Example 3. This peroxide is dissolved in the manner indicated in Example 4, by adding it first to a portion (approximately 20%) of each resin heated to about 60°C and the solution formed is thereafter incorporated into the remaining portion.

In order to measure the agglomerating power of these resins, they are applied, in accordance with the process which is also given in Example 4, to coils consisting of a copper wire of diameter 1 mm, covered with glass and silicone resin, and the layers deposited are cured by heating. It is noted that, once polymerisation is complete, no matter what the temperature, the duration of polymerisation and the resin employed may be, these layers are perfectly dry. Thereafter, the coils are broken, at ambient temperature, by exerting a tensile force using a tensometer, and the agglomerating power of the resins, which ranges from 15 kg to 30 kg, is thus obtained.

The coils are then aged by heating at 220°C for 1,000 hours; this results in a lowering of the agglomerating power of the resins which now ranges from 7 to 14 kg.

EXAMPLE 6

846 g of $C_6H_5SiCl_3$ (4 mols), 1,265 g of $(C_6H_5)_2SiCl_2$ (5 mols), 1,035 g of $(CH_3)HSiCl_2$ (9 mols), 217 g of $(CH_3)_3SiCl$ (2 mols) and 5,100 g of isopropyl ether are introduced into a 20 l flask equipped with a stirrer and a system for measuring the temperature.

Stirring is started and 5,220 g of water are run into this solution over a period of 4 hours. During this addition, the temperature increases uniformly and finally reaches 65°C. Stirring is maintained for a further 1 hour; at the end of this period, the aqueous layer is removed and the isopropyl ether layer containing the cohydrolysate is washed with 5 times 2 liters of water and is then placed in a distillation apparatus. The isopropyl ether is then distilled by heating under a pressure below atmospheric pressure.

11 g of sodium carbonate are added to the residue obtained, stirring is started and the whole is heated for 2 hours at a temperature of 90°C. The residue is filtered off and mixed with 20 g of an activated clay containing 1.9% of HCl, and the whole is kept at a temperature of 225°C for 8 hours and then filtered. The volatile products present in the residue are driven off by heating under a pressure below atmospheric pressure. Heating is stopped when the temperature reaches 200°C for a pressure of 3 mm of mercury.

The residue is a liquid polymer, of viscosity 3450 cPo at 25°C, containing 11.2% of SiH groups (one SiH group = 29 g), weighing 1,920 g.

EXAMPLE 7

A sufficient amount of ethylene glycol dimethacrylate is added to the resin $A'_4$ of viscosity 6,000 cPo at 25°C, of the average general formula:

$$(CH_3)_{0.75}(C_6H_5)_{0.75}(CH_2=CH)_{0.25}(CH_3O)_{0.1-1}(OH)_{0.006}SiO_{1.07}$$

described in Example 3, to have a mixture consisting of 88.6% of the resin $A'_4$ and 11.4% of the dimethacrylate.

This mixture is divided into 3 substantially equal portions and a different amount of the polymer of viscosity 3450 cPo at 25°C, prepared in the preceding Example, is added to each of them; 3 compositions $S_1$, $S_2$ and $S_3$ are thus obtained, in which the numerical ratios of SiH group to vinyl groups range from 0.15/1 to 0.34/1.

The precentages of the mixture and of the polymer as well as the values of the SiH groups/vinyl groups ratios for each composition are given in the table below.

| Composition | Mixture based on 88.6% of resin $A_4'$ and 11.4% of ethylene glycol dimethacrylate | Polymer of viscosity 345 cPo at 25°C | SiH groups/vinyl groups ratio |
|---|---|---|---|
| $S_1$ | 90 | 10 | 0.15 |
| $S_2$ | 85 | 15 | 0.24 |
| $S_3$ | 80 | 20 | 0.34 |

Each composition is catalysed by means of 1% of dicumyl peroxide and 0.0005% of platinum used in the form of the organic complex described in Examples 6 and 7 of French Pat. No. 1,486,530.

In order to incorporate the dicumyl peroxide more easily, approximately one-fifth of each composition is heated to 60°C and all the peroxide is added at this temperature; after obtaining a clear solution, the latter is mixed with the remaining four-fifths which have been left to stand at ambient temperature.

The agglomerating power (or the cohesive force) of each composition is measured in accordance with the process given in Example 4; however, after the first impregnation the coils are heated for 3 hours 30 minutes at 150°C and after the 2nd impregnation they are heated for 24 hours at 180°C. The value of the agglomerating power of each composition is as follows: $S_1$ — 19; $S_2$ — 20; and $S_3$ — 23.

I claim:

1. A liquid methylvinylphenylpolysiloxane resin comprising recurring units chosen from more than one of the formulae: $CH_3SiO_{1.5}$, $(CH_3)_2SiO$, $CH_3(CH_2=CH)SiO$, $CH_3(C_6H_5)SiO$, $C_6H_5SiO_{1.5}$ and $(C_6H_5)_2SiO$, and corresponding to the average general formula:

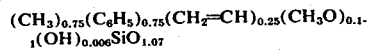

in which Q represents an alkyl group with 1 to 4 carbon atoms, $x$ and $y$, which may be identical or different, each represent a number from 0.55 to 0.85, $z$ represents a number from 0.08 to 0.35, $u$ represents a number from 0.08 to 0.3, and $w$ represents a positive number which does not exceed 0.1, the sum $x + y + z$ being from 1.5 to 1.9 and having a functional group content E of from 2.5 to 2.9.

2. A resin according to claim 1, wherein Q represents a methyl group, $x$ and $y$ each represent a number from 0.6 to 0.8, $z$ represents a number from 0.1 to 0.3, $u$ represents a number from 0.11 to 0.23, and $w$ represents a positive number which does not exceed 0.07, the sum $x + y + z$ being from 1.55 to 1.85, and the functional group content E is from 2.55 to 2.85.

3. Process for preparing a liquid methylvinylphenylpolysiloxane resin as defined in claim 1, which comprises the following steps, in sequence:

a. cohydrolysing a mixture of chlorosilane chosen from more than one of those of the formulae $CH_3SiCl_3$, $(CH_3)_2SiCl_2$, $CH_3(CH_2=CH)SiCl_2$, $CH_3(C_6H_5)SiCl_2$, $C_6H_5SiCl_3$ and $(C_6H_5)_2SiCl_2$, the mixture being such that i. the number of methyl radicals, the number of phenyl radicals and the number of vinyl radicals per silicon atom in the mixture coincide with the specified values for $x$, $y$ and $z$, respectively, ii. the sum of these numbers coincides with the specified values for the sum $x + y + z$, and iii. the functional group content E, calculated from these numbers is from 2.5 to 2.9; by contacting a solution of an organic diluent containing 20 to 50% by weight of the chlorosilane mixture at a temperature of from 5°C to 80°C, with an aqueous solution, of an alkanol with 1 to 4 carbon atoms, said solution providing for each gram atom of chlorine in the chlorosilane mixture at least 0.5 mol of alcohol and at least 0.3 mol of water;

b. isolating the organic layer and treating it with at least one mol of water per mol of chlorosilane, at a temperature of from 10°C to 100°C, and c. isolating the organic layer again, removing the acid therefrom and distilling the organic diluent.

4. Process according to claim 3, wherein, in step (b), at least 2 mols of water are used per mol of chlorosilane.

5. Process according to claim 3, wherein the resin obtained is heated, in a medium comprising an organic diluent, with 0.005 to 0.5% by weight, relative to the resin, of an alkali metal hydroxide or quaternary ammonium or phosphonium hydroxide.

6. A composition comprising a liquid resin as defined in claim 1 and an organic peroxide in an amount of 0.5 to 5% by weight, based on the weight of the resin.

7. A composition comprising: 83 to 95% by weight of a liquid resin as defined in claim 1, wherein $u$ represents a number from 0.08 to 0.2 and $w$ represents a positive number which does not exceed 0.03, and 17 to 5% by weight, based on the weight of the composition, of a copolymerisable organic compound which possesses at least one aliphatic unsaturated bond.

8. A composition according to claim 7, wherein the copolymerisable organic compound is present in an amount of 15 to 6% by weight, based on the weight of the composition.

9. A composition according to claim 7, wherein the copolymerisable organic compound is selected from an ester of a saturated or unsaturated carboxylic acid and a glycol, or an unsaturated aliphatic alcohol an unsaturated ether of a polyol and an aromatic compound.

10. A composition according to claim 6, wherein the organic peroxide is present in an amount of 0.5 to 5% by weight, based on the weight of the composition.

11. A composition according to claim 6, wherein the organic peroxide is dicumyl peroxide, di-(tertiarybutyl) peroxide, tertiary butyl perbenzoate, benzoyl peroxide or 2,5-dimethyl-2,5-di(tertiarybutyl peroxy)-hexane.

12. A composition according to claim 6, which additionally comprises an organosilicon polymer possessing SiH bonds, and a platinum containing compound which is soluble or dispersible in the remainder of said composition in an amount of 0.0002 to 0.003% by weight based on the weight of platinum.

13. A composition according to claim 7 which additionally comprises an organosilicon polymer possessing SiH bonds, and a platinum-containing compound which is soluble or dispersible in the remainder of said composition in an amount of 0.0002 to 0.003% by weight based on the weight of platinum.

14. A method of protecting an electrically conducting material, which comprises applying thereto a composition as defined in claim 6 and curing the composition.

15. A method of protecting an electrically conducting material which comprises applying thereto a composition as defined in claim 12 and curing it by heating from 130° to 180°C. for at least 3 hours.

* * * * *